S. KAKO.
ELECTRIC STEAM IRON.
APPLICATION FILED NOV. 5, 1918.
1,347,224.
Patented July 20, 1920.
2 SHEETS—SHEET 1.
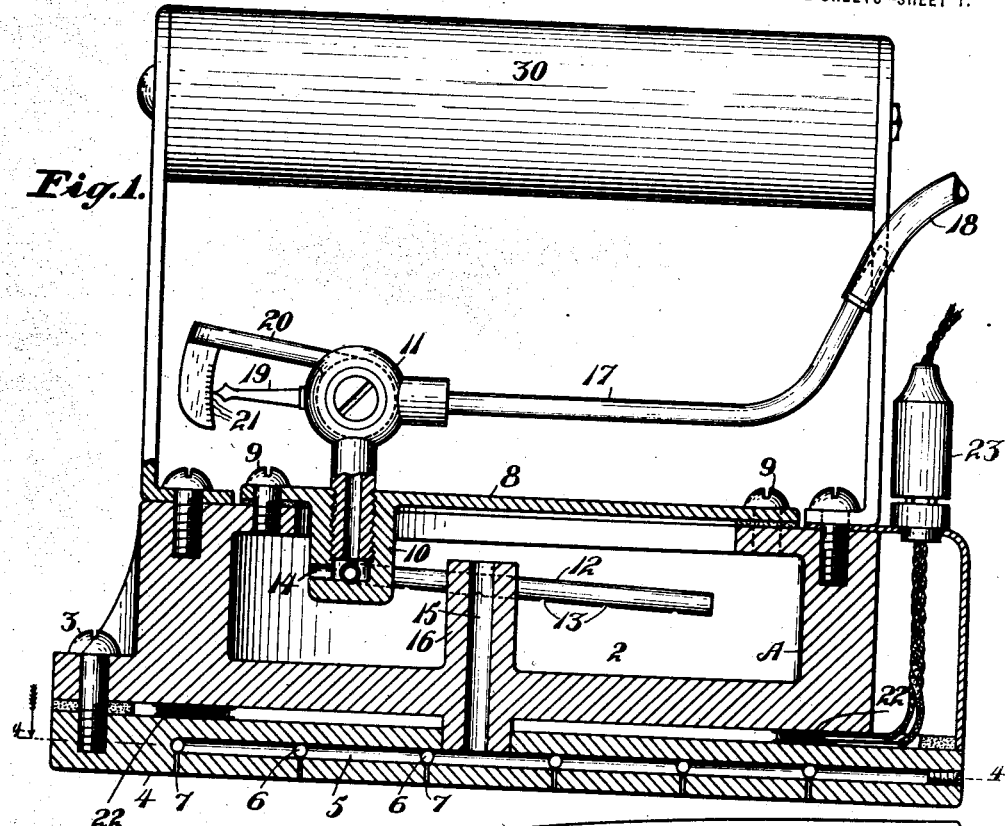
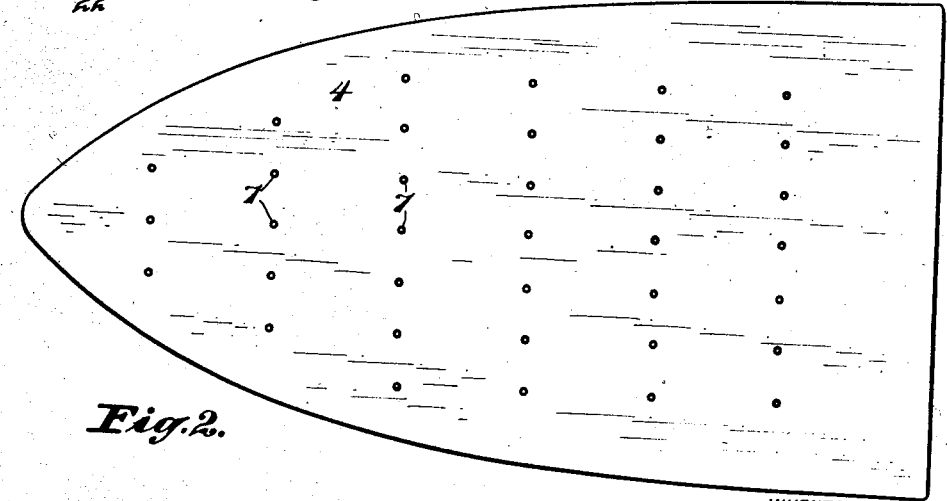
INVENTOR
Shintaro Kako
BY
Strong & Townsend
ATTORNEYS

S. KAKO.
ELECTRIC STEAM IRON.
APPLICATION FILED NOV. 5, 1918.

1,347,224.

Patented July 20, 1920.
2 SHEETS—SHEET 2.

INVENTOR
Shintaro Kako

BY
Strong & Townsend
ATTORNEYS

UNITED STATES PATENT OFFICE.

SHINTARO KAKO, OF LOS ANGELES, CALIFORNIA.

ELECTRIC STEAM-IRON.

1,347,224.   Specification of Letters Patent.   Patented July 20, 1920.

Application filed November 5, 1918. Serial No. 261,184.

*To all whom it may concern:*

Be it known that I, SHINTARO KAKO, a subject of the Emperor of Japan, residing at Los Angeles, in the county of Los Angeles and State of California, have invented new and useful Improvements in Electric Steam-Irons, of which the following is a specification.

This invention relates to an electric steam iron and particularly to improvements on the structure shown in Patent No. 1,143,050, issued to me June 15th, 1915.

One of the objects of the present invention is to provide a simple, cheaply manufactured electric iron, and in conjunction therewith means for generating steam and properly directing the same to the garment or other article being pressed. Another object of the invention is to provide a compact arrangement of the steam generator and electric heating element employed; furthermore, to provide means for regulating and delivering a flow of water to the steam generator and also to provide a trap chamber to positively prevent escape of water except in the form of steam. Further objects will hereinafter appear.

The invention consists of the parts and the construction, combination and arrangement of parts as hereinafter more fully described and claimed, having reference to the accompanying drawings, in which—

Figure 1 is a central, vertical, longitudinal section through the iron.

Fig. 2 is a bottom view of the same.

Figure 3:
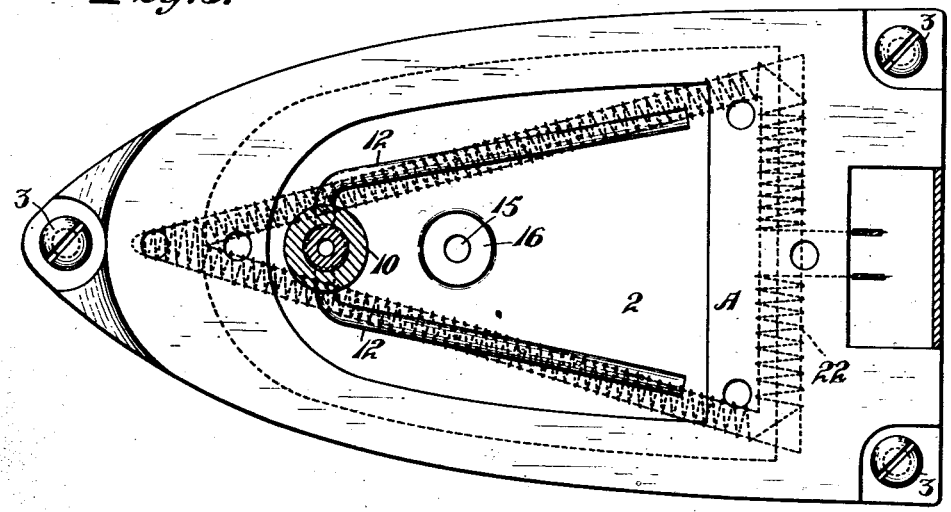
Fig. 3 is a plan view, partially in section showing the cover plate and the handle removed.
Figure 4:
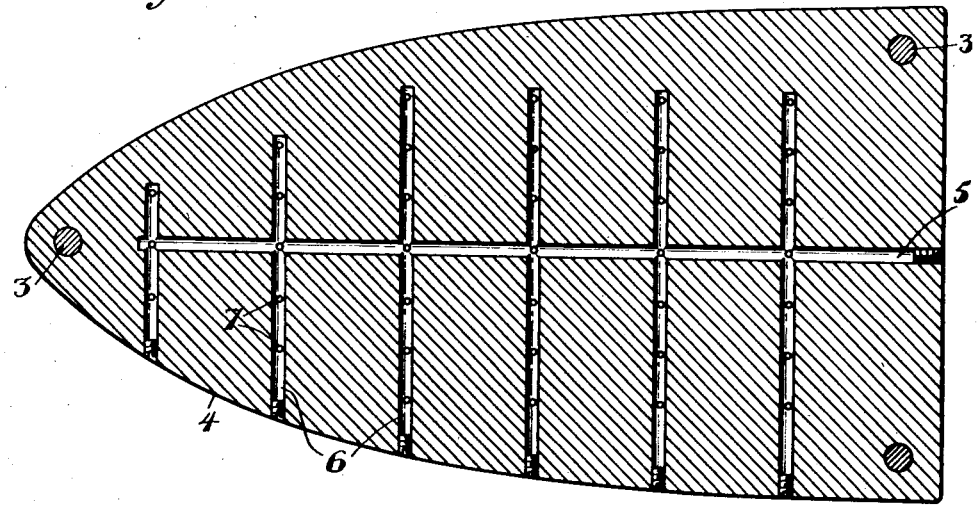
Fig. 4 is a plan section taken on the line 4—4 of Fig. 1.

Referring to the drawings in detail, A indicates the main body portion of the iron. Formed interior thereof is a trap chamber 2 and secured to the bottom by screws 3 is a perforated plate 4. Formed interior of the plate is a central passage 5 and communicating with said passage is a plurality of transverse passages 6, all of which are perforated, as at 7, to permit escape of steam, as will hereinafter be described.

Forming a closure for the trap chamber 2 is a cover plate 8, which is secured to the main body portion by means of screws 9. Forming a portion of the cover plate is a cylindrical extension 10 which is threaded to receive the stem of a valve 11. The member 10 is hollow and threaded for the reception of the valve and it is also provided with a pair of distributing arms 12, one arranged on each side thereof, these arms being perforated, as at 13, to permit an even distribution and delivery of water to the trap chamber 2, the member 10 being also perforated, as at 14, to permit a slight discharge at the front end of the chamber.

Forming a communication between the trap chamber and the central passage 5 formed in the bottom plate 4 is a passage 15. This passage is formed in an upwardly extending boss 16, which serves the function of trapping all water admitted to the chamber 2. The valve 11 may be of ordinary construction and is provided for the purpose of delivering water to the chamber 2. It is provided with an inlet pipe 17 to which may be connected a flexible hose 18. It is also provided with a stationary indicator 19 and a movable wood handle 20 which is graduated, as at 21, to indicate the opening of the valve or the amount of water being delivered. The iron is otherwise provided with an electric heating element 22 of suitable construction, which is interposed between the main body of the iron and the bottom plate 4, this heating element being connected with a plug 23 which, in turn, may be connected with a lighting fixture or the most convenient connection available.

In actual operation, with the plug inserted and current passing through the element 22, it is obvious that not only the bottom plate 4 will become heated, but also the main body of the iron. A slight opening of the valve 11 permitting water to enter the trap chamber will therefore cause generation of steam which is permitted to escape through the passages 15, 5, 6 and 7. Moisture in the form of steam is thus blown directly into the garment or other article being ironed thereby avoiding the necessity of sprinkling the same before ironing, the amount of moisture required for different garments being regulated to a nicety by adjusting the position of the graduated handle 20 with relation to the stationary pointer 19.

The iron constructed as here shown is simple and substantial in construction, and the whole steam generating mechanism, together with the heating element employed, is contained within the iron. It can therefore readily be seen that all complications are avoided, as the only regulation required is movement of the valve handle 20 to increase or decrease the flow of water to the generator. The danger of water escaping directly through the passages 15, 5, 6 and 7 is positively eliminated, due to the fact that the boss 16 is extended a considerable distance above the bottom of the trap or steam generating chamber 2.

While a specific form of valve and mechanism for regulating the same is here shown, I wish it understood that any other suitable form of valve may be employed; that the materials and finish of the several parts may be such as the experience and judgment of the manufacturer may dictate; and also that any suitable form of handle 30 may be applied, as this does not form any part of the present invention.

Having thus described my invention, what I claim and desire to secure by Letters Patent is:

1. A flat-iron smoothing and sprinkling device including superposed smoothing and water-containing and distributing members with an interposed trap, a source of supply, and a valve connected with the distributing members, a water supply indicator, including an arm connected with the valve, and a graduated arc carried thereby and a stationary pointer coacting with the arc.

2. A sad or flat iron including superposed smoothing and water-containing chambers, a source of water supply, diverging distributing perforated arms within the chamber, an automatically operating indicator including an index finger and a graduated arc connected and movable with the valve and with relation to the index finger.

3. An electric steam iron comprising a main body portion having a combination trap and steam generating chamber formed therein, a cover plate for said chamber, a perforated bottom plate secured to the iron, an electric heating element interposed between the bottom plate and the iron, a hollow extension formed on the cover plate, a pair of perforated arms communicating with said hollow extension and secured thereto, said perforated arms being positioned within the trap and steam generating chamber and adapted to evenly distribute water therein, means for delivering water to the hollow extension and the perforated arms communicating therewith, a valve for regulating the flow of water delivered, a passage formed in the iron connecting the trap and steam generating chamber with the perforated bottom plate, and means for preventing the escape of water through said passage.

4. An electric steam iron comprising a main body portion having a combination trap and steam generating chamber formed therein, a cover plate for said chamber, a perforated bottom plate secured to the iron, an electric heating element interposed between the bottom plate and the iron, a hollow extension formed on the cover plate, a pair of perforated arms communicating with said hollow extension and secured thereto, said perforated arms being positioned within the trap and steam generating chamber and adapted to evenly distribute water therein, means for delivering water to the hollow extension and the perforated arms communicating therewith, a valve for regulating the flow of water delivered, an upwardly extending boss formed in the steam generating and trap chamber and a passage formed in said boss forming a communication between the perforated bottom plate and said trap and steam generating chamber.

In testimony whereof I have hereunto set my hand in the presence of two subscribing witnesses.

SHINTARO KAKO.

Witnesses:
SIZUTARA KAMIGASHIRA,
FRANK SATARO KODAMA.